United States Patent
Dew et al.

(10) Patent No.: US 6,245,125 B1
(45) Date of Patent: Jun. 12, 2001

(54) COPPER, NICKEL AND COBALT RECOVERY

(75) Inventors: David William Dew, Paulshof; Deborah Maxine Miller, Johannesburg, both of (ZA)

(73) Assignee: Billiton S.A. Limited, Johannesburg (ZA)

(*) Notice: Subject to any disclaimer, the term of this patent is extended or adjusted under 35 U.S.C. 154(b) by 0 days.

(21) Appl. No.: 09/396,656

(22) Filed: Sep. 15, 1999

(51) Int. Cl.$^7$ ........................................... C22B 3/18
(52) U.S. Cl. ..................... 75/743; 205/583; 423/139; 423/DIG. 17
(58) Field of Search ....................... 423/DIG. 17, 139; 205/583; 75/743

(56) References Cited

U.S. PATENT DOCUMENTS 5,919,674 * 7/1999 Tunley ........................ 435/168
5,948,375 * 9/1999 Stallknecht ................. 423/DIG. 17

FOREIGN PATENT DOCUMENTS

1422792 * 10/1992 (AU) ........................... 423/DIG. 17

* cited by examiner

Primary Examiner—Melvyn Andrews

(57) ABSTRACT

A process for the recovery of copper and nickel from a copper and nickel sulphide concentrate in slurry form. The slurry is subjected to a biological oxidation turning the copper sulphide to soluble copper sulphate and the nickel to nickel sulphate. The liquid containing the sulphates is separated from the slurry and treated with a solvent extraction reagent so that copper ions are exchanged by the reagent for hydrogen ions to produce a raffinate which is high in sulphuric acid and low in copper sulphate. The solvent extraction reagent is then stripped from the raffinate with a sulphuric acid solution. Copper is electrically harvested from the sulphuric acid solution and a portion of the copper depleted raffinate is returned to form a slurry with additional ore for subsequent biological oxidation. Nickel is recovered from the remaining portion of the raffinate. The preferred bacterium is at least one of Thiobacillus Ferro-oxidants, Thiobacillus Thio-oxidants, Leptospirrilum Ferro-oxidants, Thiobacillum Caldus, Acidimicrobium and Sulpholobus.

19 Claims, 3 Drawing Sheets

COPPER, NICKEL AND COBALT RECOVERY

BACKGROUND OF THE INVENTION

This invention relates to the recovery of at least copper and nickel from a concentrate containing copper and nickel minerals.

The specification of U.S. Pat. No. 5,919,674 describes a process for the recovery of copper which includes the following steps:

(a) biologically oxidising copper sulphide concentrate in slurry form to dissolve copper as soluble copper sulphate;

(b) subjecting the slurry to solid/liquid separation to produce a solution with a high copper concentration;

(c) treating the solution with a solvent extraction reagent so that copper ions are exchanged by the reagent for hydrogen ions to produce a raffinate which is high in sulphuric acid and low in copper sulphate;

(d) stripping the solvent extraction reagent with a sulphuric acid solution;

(e) electrowinning copper from the sulphuric acid solution; and (f) using at least a portion of the raffinate from step (c) in step (a).

SUMMARY OF THE INVENTION

The present invention is concerned with a process for the recovery of at least copper and nickel.

The invention provides a process for the recovery of at least copper and nickel from a concentrate containing copper and nickel minerals which includes the following steps:

(a) biologically oxidising the mineral concentrate in slurry form to dissolve copper as soluble copper sulphate and nickel as nickel sulphate;

(b) subjecting the slurry to solid/liquid separation to produce a solution with a high copper and nickel concentration;

(c) treating the solution with a solvent extraction reagent so that copper ions are exchanged by the reagent for hydrogen ions to produce a raffinate which is high in sulphuric acid and low in copper sulphate;

(d) stripping the solvent extraction reagent with a sulphuric acid solution;

(e) electrowinning copper from the sulphuric acid solution;

(f) using a portion of the raffinate from step (c) in step (a); and (g) recovering nickel from the raffinate which remains after step (f).

The ratio of concentrate to solution prior to the solvent extraction step (c), i.e. in the feed to the solvent extraction step, may be adjusted e.g. by altering the ratio of raffinate to concentrate in step (a), to give a copper concentration in solution, as feed to step (c), in excess of 10 grams per litre, preferably in excess of 20 grams per litre and desirably of from 25 to 30 grams per litre.

To achieve this desired high level of copper concentration the leachate from step (a), must be concentrated beforehand to a higher level, for the leachate is filtered and washed and this dilutes the concentrate.

The biological oxidation in step (a) may be carried out using any suitable bacterium, bacteria, archaea (or archaebacteria), or other similar microorganism. Depending on the mineral type, use may for example be made of one or more mesophiles or moderate thermophiles or thermophiles such as the following: mesophiles: Thiobacillus ferrooxidans (ATCC 23270), Thiobacillus thiooxidans (ATCC 19377), Leptospirrilum ferrooxidans (ATCC29047); moderate thermophiles: Thiobacillus caldus (ATCC 51756), acidimicrobium (DS M2 10 331) and strains Sulfobacillus (DSMZ 10332 and ATCC 51911); thermophiles: strains Sulfolobus (DSMZ 639, DSMZ 1616, DSMZ 1651,DSMZ 5389, DSMZ 6482 and DSMZ 7519).

A combination of mesophiles such as *Thiobacillus ferrooxidans, Thiobacillus thiooxidans* and *Leptospirrilum ferrooxidans* may be used for the oxidation of many sulphide minerals including pentlandite, chalcocite, bornite, covellite, digenite, enargite and tetrahedrite. If these bacteria are used then the temperature in the tank used for carrying out step (a) may be maintained at a value of from 30° C. up to about 45° C.

Moderate thermophiles such as *Thiobacillus caldus, acidimicrobium* and the type strain Sulfobacillus may be used for the leaching of pentlandite, chalcocite, bornite, covellite, digenite, enargite, tetrahedrite and chalcopyrite. The temperature of the tank used for carrying out step (a) may then be maintained at a value of from about 45° C. to 65° C. The predominant bacterial strain in such a mixed culture will depend at least on the operating temperature. Thermophiles of the type Sulfolobus may be used for leaching the same minerals as the moderate thermophiles, and are particularly effective for leaching chalcopyrite. The temperature of the tank used for carrying out step (a) may then be maintained at a value of from 60° C. to 90° C., the optimum temperature again being dependent on the strain used. The strain *Sulfolobus metallicus*, for example, shows optimal growth in the temperature range 65° C. to 78° C.

Step (b) may be carried out in any suitable way and, for example, use may be made of settling or filtration.

Wash water may be introduced in step (b) to ensure that the solid residue is washed free of copper sulphate and nickel sulphate.

Step (c) may be carried out using any appropriate solvent extraction reagent such as an oxime-type reagent.

Preferably steps (b) and (c) are controlled so that the raffinate contains from 30 to 40 grams per litre free sulphuric acid. The copper content of the raffinate may lie in the range of from 2 to 5 grams per litre. This copper content is not necessarily disadvantageous for as much as possible of the raffinate is recycled.

The concentration level of sulphuric acid in the raffinate is dependent at least on the nature of the solvent extraction reagent which is used in step (c). This level should, within reason, be as high as possible. However solvent extraction reagents which are currently available and which are known to the applicant do not readily permit a concentration of sulphuric acid materially in excess of 40 grams per litre to be attained.

The aforementioned process may be modified by using the high copper concentration solution produced in step (b) to chemically pre-leach the mineral concentrate, subjecting the leachate to a solid/liquid separation step, directing the separated liquid to the solvent extraction step (c), and subjecting the separated solids to the biological oxidation step (a).

Prior to step (g), iron may be removed e.g. by precipitation from the raffinate which remains after step (f). Copper may also be removed by precipitation; preferably as a sulphide.

Iron may also be removed by precipitation prior to step (b) or prior to step (c). The pH of the slurry or the solution may be adjusted to a pH value in the range of from 2,0 to 3,5 at a temperature of from 30° C. to 90° C. Suitable neutralisation agents for iron precipitation include limestone, lime and magnesium oxide.

Nickel sulphate may be removed, e.g. by ion exchange or solvent extraction from the said remaining effluent, in step (g), or from the liquid which is directed to the solvent extraction step (c) (referring to the modified process).

Nickel may alternatively be recovered by precipitation as an hydroxide, carbonate or sulphide.

BRIEF DESCRIPTION OF THE DRAWINGS

The invention is further described by way of example with reference to the accompanying drawings in which.

DESCRIPTION OF PREFERRED EMBODIMENTS

Figure 1A:
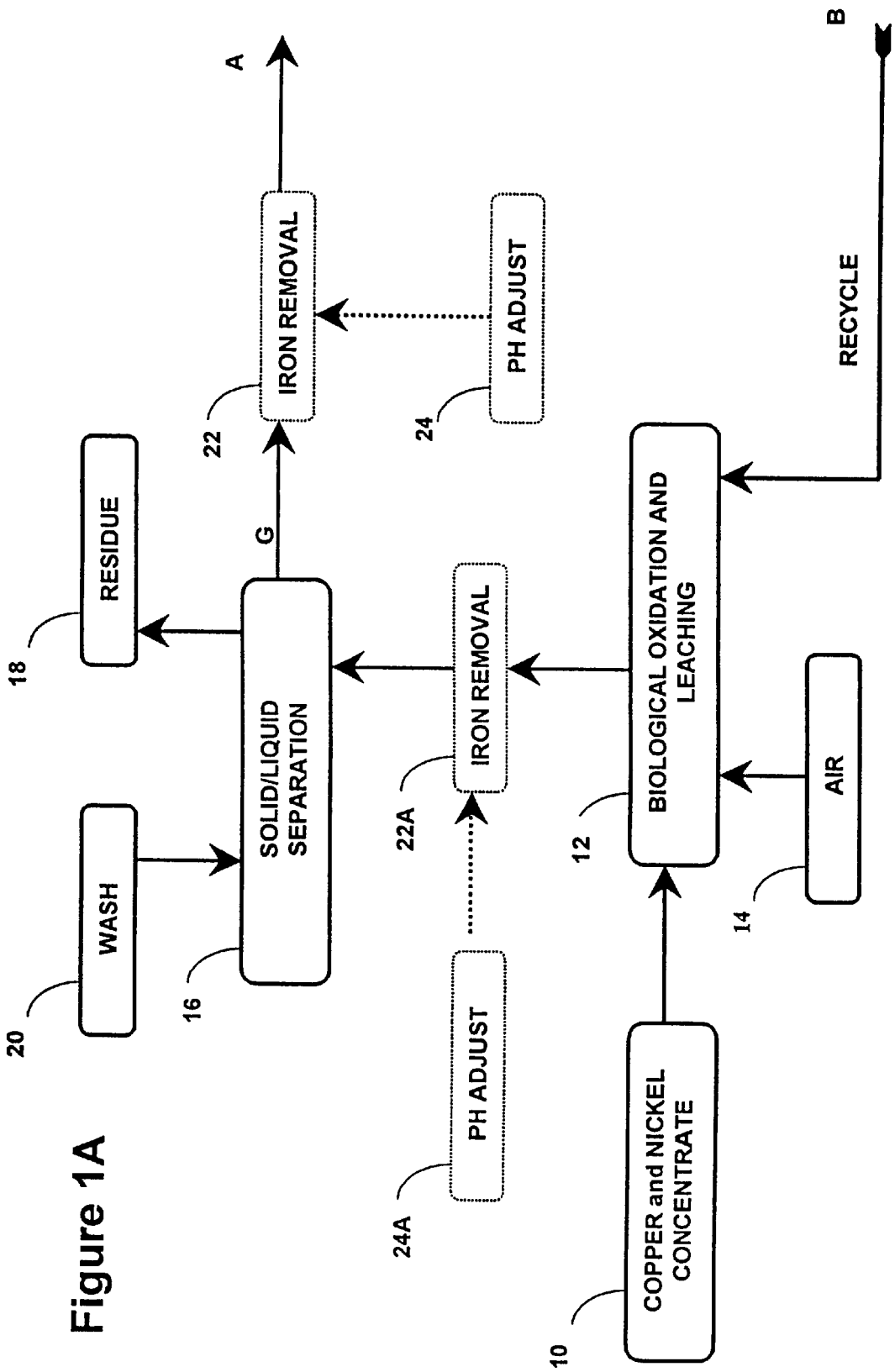
FIG. 1A illustrates in block diagram form a first portion of the process of the invention.
Figure 1B:
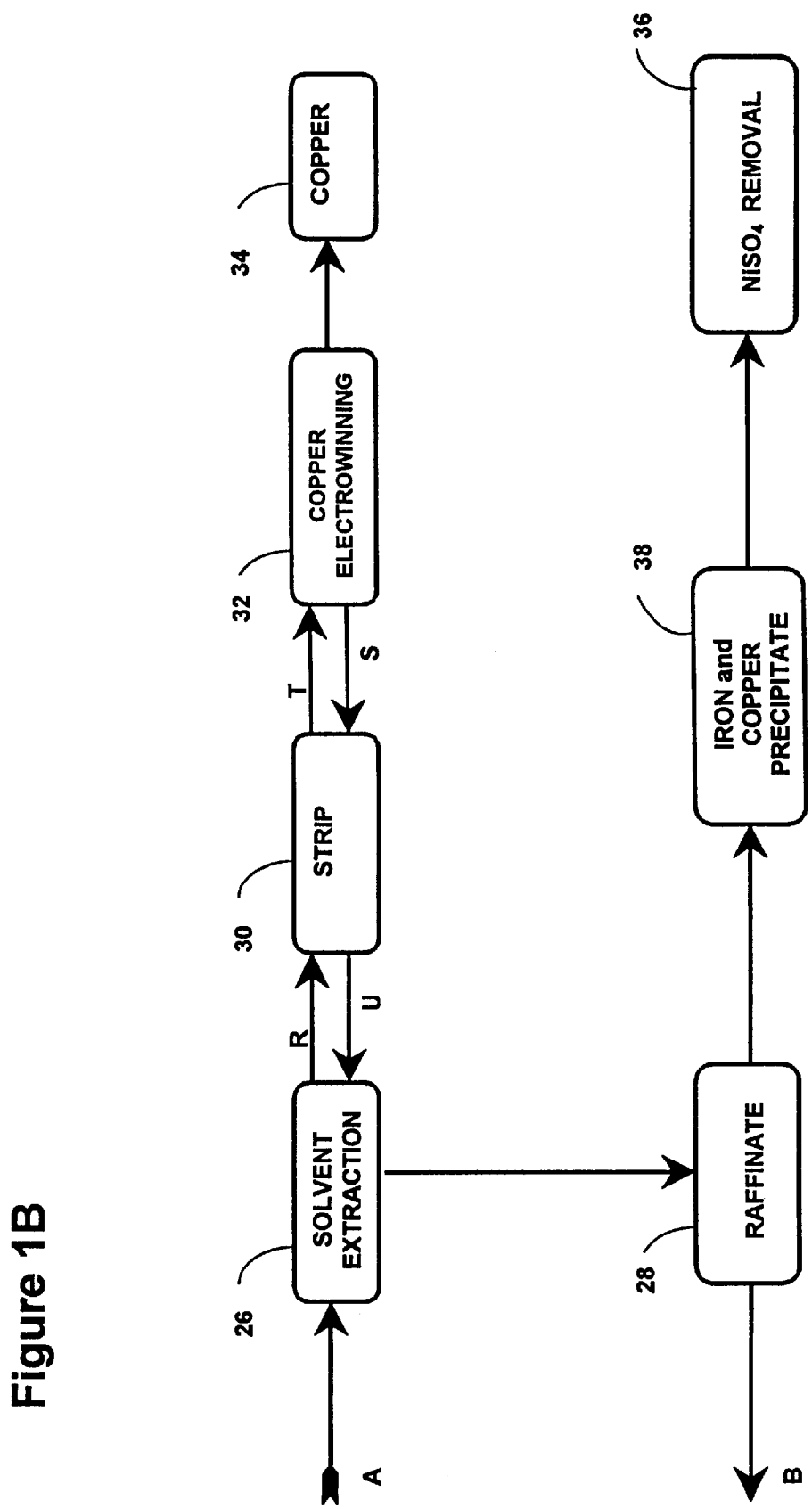
FIG. 1B illustrates in block diagram form a second portion of the process of the invention.

FIGS. 1A and 1B illustrate a process according to one form of the invention for the recovery of copper and nickel from a concrete containing copper and nickel minerals.

A concentrate 10 which contains copper and nickel minerals is treated in a bacterial oxidation system 12 which consists of several agitated tanks in series, with the addition of air 14 to supply the required oxygen for microbial growth and sulphide mineral oxidation.

The bacterium, bacteria or archaea (or archaebacteria), used for the biological oxidation depend on the nature of the sulphide concentrate. For example one or more of the following, and preferably all four, are used for the bacterial leaching of pentlandite, chalcocite, bornite, covellite, digenite, enargite and tetrahedrite: *Thiobacillus ferrooxidans, Thiobacillus thiooxidans, Thiobacillus caldus* and *Leptospirrilum ferrooxidans*. These bacteria are effective at temperatures in the range of from 30° C. up to about 45° C. and the temperature of the tank or tanks in which the oxidation is carried out is maintained at an optimum value. On the other hand a sulphide concentrate such as chalcopyrite is not easily oxidised by these bacteria. Moderate or extreme thermophilic bacteria are, however, effective on chalcopyrite. These bacteria or archaea are not well characterised and several strains have been reported. Thermophiles are typically archaea or archaebacteria of the strains Sulfolobus and a number of strains which are effective at temperatures of from about 60° C. to 90° C. are reported in the literature. Moderate thermophiles such as *Thiobacillus caldus, acidimicrobium* and bacteria of the strain Sulfobacillus are effective at lower temperatures, of from about 45° C. to 65° C.

If thermophiles are used then the temperature of the agitated tank or tanks is maintained at an optimum value which depends on the particular strain of Sulfolobus actually used, with a typical value being in the range of from 60° C. to 90° C. *Sulfolobus metallicus*, for example, shows optimum growth in the temperature range 65° C. to 78° C.

Copper and nickel are respectively dissolved from the concentrates as soluble copper sulphate and nickel sulphate. Iron in solution is constantly reoxidised to ferric sulphate using air and sulphuric acid which is introduced with the solution used to form a slurry. The ratio of concentrate to solution is adjusted to give a copper concentration in the feed to the solvent extraction step (c) of from 20 to 25 grams per litre.

The slurry leaving the biological system 12 consists of a bioleach residue and an acidic solution. The main components of the solution are copper sulphate, nickel sulphate, sulphuric acid and ferric sulphate. The slurry is subjected to a solid/liquid separation step 16. Residue solids 18 can be separated from the solution in any appropriate way and for example use may be made of countercurrent decantation or filtration or both techniques. Wash water 20 is introduced to ensure that the solid residue is free of copper sulphate and in this way the solution, which prior to washing should have a copper concentration of from 30 to 40 grams per litre, is diluted to 20 to 25 grams of copper per litre.

Iron 22 may be removed from solution by adjusting the solution pH (step 24) after removal of residue solids to pH 2.0 to 3.5 using limestone, or other suitable reagents such as lime, or magnesium oxide at a temperature in the range 30° C. to 90° C. Precipitation at elevated temperatures will reduce co-precipitation of copper and improve the settling characteristics or filterability of the solids formed, improving final solid/liquid separation.

As is indicated by a process step 22A, shown in dotted outline, the removal of iron, in a manner which is similar to that described, may alternatively be accomplished before the removal of residue solids, i.e. prior to the step 16.

The clean solution, which is free of solids, is subjected to a solvent extraction step 26 wherein a solvent extraction reagent exchanges copper ions so that the solution (the raffinate) is high in sulphuric acid and low in copper sulphate. The sulphuric acid concentration should be as high as possible but this depends on the nature of the solvent extraction reagent used. Currently available reagents produce sulphuric acid concentrations of up to 30 to 40 grams per litre. Use may be made of oxime-type reagents which are commercially available for the solvent extraction of the copper. The copper is removed, being displaced by sulphuric acid.

It is important to have the copper concentration in the feed to the solvent extraction unit at as high a level as possible. The raffinate 28 leaving the step 26 will then contain from 30 to 40 grams per litre of sulphuric acid.

As much as possible of the raffinate 28 is used to feed the biological leach system for the sulphuric acid contained therein can be used to satisfy the sulphuric acid requirements of the biological leach system. Thus a large proportion of the raffinate is used to repulp the concentrate which is fed to the system 12.

The solvent extraction reagent R which is loaded with copper is stripped in a phase 30 with a strong sulphuric acid solution S which is the spent electrolyte from an electrowinning step 32. A strong electrolyte T passes from the phase 30 to the electrowinning step 32 wherein copper 34 electrowon, and stripped solvent U is returned from the phase 30 to the solvent extraction step 26.

Copper concentrates often contain some cobalt which will also be solubilised by the biological oxidation. As a large portion of the raffinate 28 is recycled to the phase 12 the concentration of cobalt increases.

It is possible to recover the cobalt from the excess raffinate after solvent extraction for copper. This is done by solvent extraction reagents which are specific for cobalt or by selective precipitation. These methods require careful neutralization to a controlled pH before solvent extraction or precipitation of cobalt.

There are many copper concentrates that contain both copper and nickel and the present invention is concerned particularly with these concentrates. In these concentrates nickel is usually present as Pentlandite. The concentration of nickel can also be increased by recycling raffinate to the phase 12.

At least cobalt is invariably present with nickel, so all three metals may be present. It is difficult to extract cobalt, without extracting nickel, and vice versa. The two metals may however be separated from each other using reagents such as Cyanex 272 and Versatic acid.

In the case of the presence of nickel, the amount of nickel is usually much greater than the amount of cobalt, relative to copper. Recycling of the raffinate can cause the concentration of nickel to rise excessively. Nickel sulphate can however be removed (step 36) from that portion of the raffinate which is not recycled to the phase 12, using any suitable technique, e.g. ion exchange, solvent extraction, or by precipitation as an hydroxide, carbonate or sulphide. Prior to the step 36 iron and the remaining copper in the non-recycled raffinate can be removed by precipitation (step 38); e.g. iron as an hydroxide and copper as an hydroxide or preferably as a sulphide.

Available solvent extraction reagents enable the selective extraction of copper over iron to be achieved. These reagents are however more selective with regard to iron in ferrous form than in ferric form. The ferric form thus accumulates and must be bled from the system when it reaches unacceptable concentration levels. This can be wasteful particularly in a system in which cobalt is used to enhance the extraction process for the cobalt is continuously bled from the system.

Figure 2:
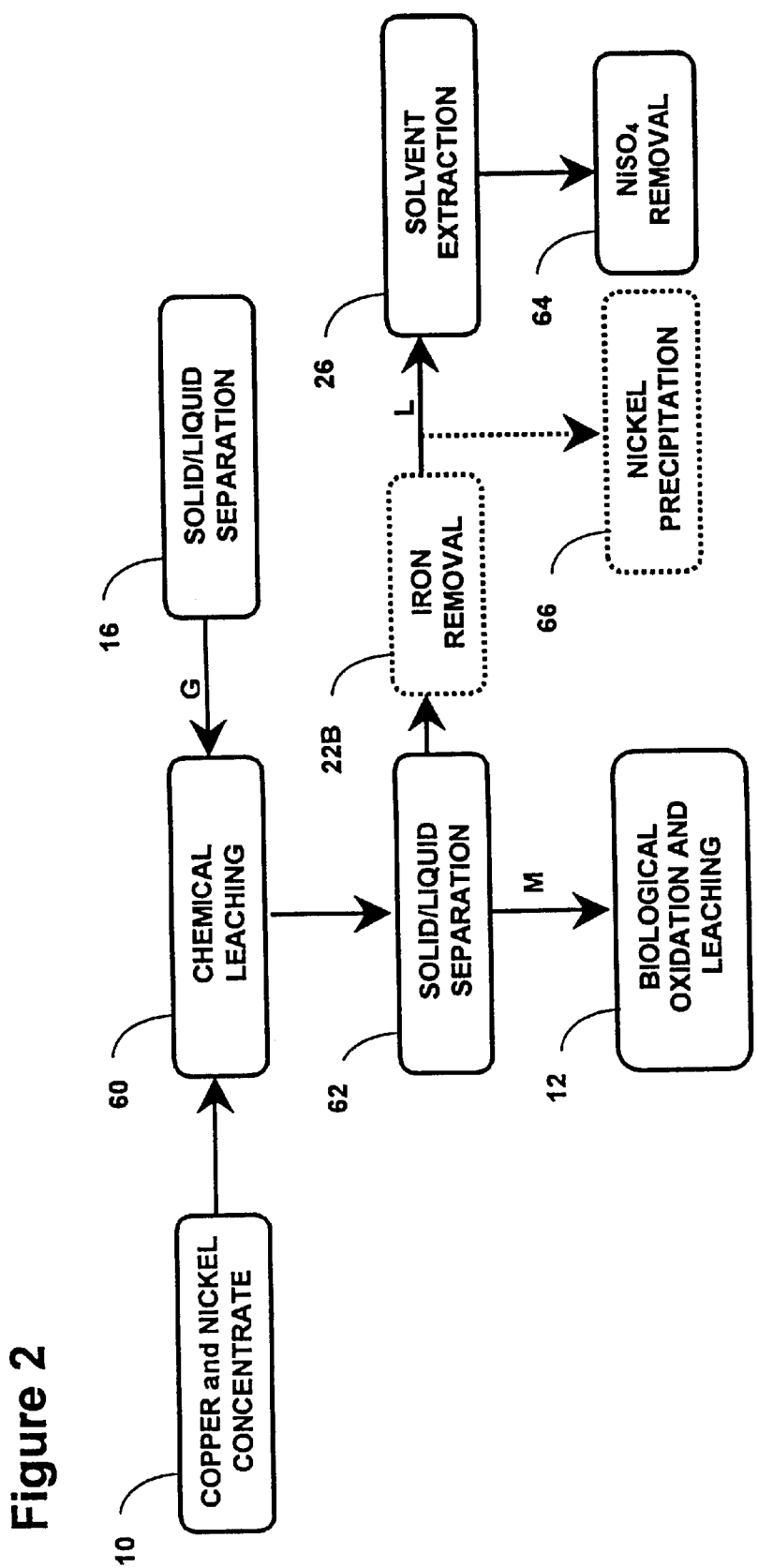
FIG. 2 illustrates a variation of the basic process of FIGS. 1A and 1B.

FIG. 2 illustrates a variation of the basic process shown in FIGS. 1A and 1B, which is directed to addressing this problem.

The feed G from the separation stage 16 to the solvent extraction step 26 is diverted and used to chemically pre-leach the copper and nickel concentrate 10, in a step 60. The leachate is subjected to a solid/liquid separation step 62 and the liquid L is then diverted to the solvent extraction step 16, for treatment and processing in the manner which has been described hereinbefore. The solids M are then subjected to the biological oxidation and leaching step 12, in the manner which has been described hereinbefore.

It has been found that the treatment of concentrates of copper and nickel benefits most significantly from the use of this variation whereby the concentrate is contacted with solution from the biological oxidation step. After the step 26 nickel sulphate is removed from the solution (step 64) by ion exchange, solvent extraction, or by precipitation as an hydroxide, carbonate or sulphide. The combination of raffinate recycle and concentrate pre-treatment thus applies very advantageously to concentrates of copper and nickel.

Iron may be removed in a step 22B (shown in dotted outline), which is similar to the step 22 in FIG. 1A.

Another variation (indicated by a step 66 in dotted outline) is that nickel may be recovered by precipitation as a hydroxide, carbonate or sulphide. This is an alternative to the step 64. A similar approach can be taken between step 16 (in the FIG. 1A flow sheet) and step 26 (in the FIG. 1B flow sheet).

The pre-leaching treatment holds important benefits. The iron which prior to the step 60 existed in the ferric form is converted to the ferrous form and, as stated, this is highly desirable for the efficient selective extraction of copper in the step 16. Another benefit is that the pre-leaching, which is done relatively quickly, reduces the duration of the step 12. This in turn reduces the likelihood that pyrite will be dissolved during the step 12. Bioleaching of pyrite will generate sulphuric acid as a reaction product. This may be a disadvantage for the acid may require neutralisation with limestone or a similar reagent.

What is claimed is:

1. A process for the recovery of at least copper, nickel and cobalt from a concentrate containing copper, nickel and cobalt minerals which includes the following steps:
    (a) biologically oxidising the mineral concentrate in slurry form to dissolve copper as soluble copper sulphate and nickel as nickel sulphate;
    (b) subjecting the slurry to solid/liquid separation to produce a solution with a high copper and nickel concentration;
    (c) treating the solution with a solvent extraction reagent so that copper ions are exchanged by the reagent for hydrogen ions to produce a raffinate which is high in sulphuric acid and low in copper sulphate;
    (d) stripping the solvent extraction reagent with a sulphuric acid solution;
    (e) electrowinning copper from the sulphuric acid solution;
    (e1) recovering cobalt from excess raffinate of step (c) using a reagent which is specific for cobalt over nickel,
    (f) recycling a portion of the raffinate from step e1 to step (a); and
    (g) recovering nickel as nickel sulphate from the raffinate which remains after step (f).

2. A process according to claim 1 wherein the copper concentration of the solution produced in step (b) is greater than 10 grams per litre.

3. A process according to claim 2 wherein the said copper concentration is greater than 20 grams per litre.

4. A process according to claim 3 wherein the said copper concentration is in the range of from 25 to 30 grams per litre.

5. A process according to claim 1 wherein iron is removed prior to step (b) or (c) by precipitation.

6. A process according to claim 5 wherein the iron is precipitated by adjusting the pH of the slurry or the solution to a pH value in the range of from 2,0 to 3,5 at a temperature of from 30° C. to 90° C.

7. A process according to claim 6 wherein pH is adjusted using limestone, lime or magnesium oxide.

8. A process according to claim 1 wherein the biological oxidation in step (a) is carried out using one or more of the following bacteria: *Thiobacillus ferrooxidans, Thiobacillus thiooxidans* and *Leptospirrilum ferrooxidans*, at a temperature of from 30° C. up to about 45° C.

9. A process according to claim 1 wherein the biological oxidation in step (a) is carried out using moderate thermophilic bacteria, selected from a least *Thiohacilllis caldus, acidimicrobium* and Sulfobacillus, at a temperature in the range of from 45° C. to 65° C.

10. A process according to claim 1 wherein the biological oxidation in step (a) is carried out using thermophiles of the strain Sulfolobus at a temperature in the range of from 60° C. to 90° C.

11. A process according to claim 1 wherein step (b) is carried out using settling or filtration.

12. A process according to claim 1 wherein, in step (c), use is made of an oxime reagent.

13. A process according to claim 1 wherein steps (b) and (c) are controlled so that the raffinate in step (c) contains from 30 to 40 grams per litre free sulphuric acid.

14. A process according to claim 1 which is modified by using the high copper concentration solution produced in step (b) to chemically pre-leach the mineral concentrate, subjecting the leachate to a solid/liquid separation step, directing the separated liquid to the solvent extraction step (c), and subjecting the separated solids to the biological oxidation step (a).

15. A process according to claim 1 wherein, prior to step (g), copper and iron are removed by precipitation from the raffinate which remains after step (f).

16. A process according to claim 1 wherein, in step (g), nickel sulphate is recovered from the said remaining raffinate by ion exchange, solvent extraction, or precipitation as an hydroxide, carbonate or sulphide.

17. A process according to claim 14 wherein the separated liquid which is directed to the solvent extraction step (c) is then subjected to treatment for nickel sulphate removal by ion exchange or solvent extraction.

18. A process according to claim 14 wherein the separated liquid which is directed to the solvent extraction step (c) is then subjected to treatment for the or recovery of nickel by precipitation as an hydroxide, carbonate or sulphide.

19. A process according to claim 14 wherein, after the solid/liquid separation step, nickel is recovered by precipitation as an hydroxide, carbonate or sulphide.

* * * * *